United States Patent [19]

Samuelson

[11] Patent Number: 4,669,840

[45] Date of Patent: Jun. 2, 1987

[54] CINEMATOGRAPH CAMERA FLICKER CONTROL AND/OR INDICATING DEVICE

[75] Inventor: David Samuelson, London, England

[73] Assignee: dSam Ltd., London, England

[21] Appl. No.: 878,763

[22] Filed: Jun. 26, 1986

[30] Foreign Application Priority Data

Jun. 26, 1985 [GB] United Kingdom ............... 8516207

[51] Int. Cl.⁴ .............................................. G03B 1/60
[52] U.S. Cl. ..................................... 352/170; 352/49; 352/141
[58] Field of Search ................. 352/170, 171, 49, 141, 352/198

[56] References Cited

U.S. PATENT DOCUMENTS

| | | | |
|---|---|---|---|
| 3,583,800 | 6/1971 | Hirata | 352/170 |
| 3,652,154 | 3/1972 | Gebel | 352/141 |
| 4,183,635 | 1/1980 | Dorig | 352/141 |
| 4,458,992 | 7/1984 | Preston | 352/141 |

*Primary Examiner*—Monroe H. Hayes
*Attorney, Agent, or Firm*—Millen & White

[57] ABSTRACT

A cinematograph camera flicker indicating or control device uses a microprocessor to determine the combinations of camera speed and/or exposure period, or shutter opening, which will be likely to cause unacceptably uneven exposure of successive frames when filming is carried out under AC powered light sources. An alarm may be activated; alternatively, the camera speed and/or the exposure period and/or the lighting frequency may be automatically controlled by the microprocessor to eliminate or reduce such uneven exposure.

18 Claims, 1 Drawing Figure

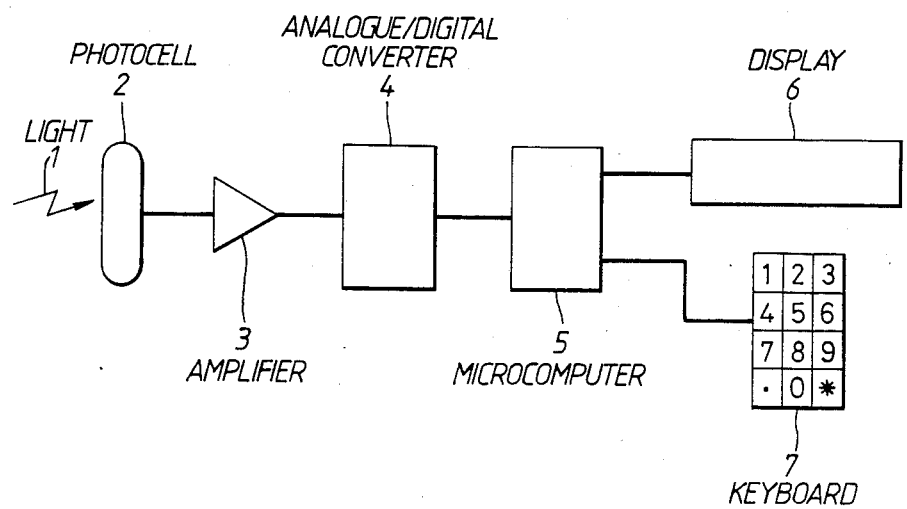

CINEMATOGRAPH CAMERA FLICKER CONTROL AND/OR INDICATING DEVICE

BACKGROUND OF THE INVENTION

The invention relates to a cinematograph camera flicker control and/or indicating device. It also relates to a cinematograph camera including such a device.

It is well known that the cinematographic process consists of taking a series of individual photographic exposures, usually at 24 or 25 frames per second. For the image density of successive frames to be consistent the photographic exposure must be the same for each frame. If the density of successive images is not substantially the same and if the changes are significant and rapid the picture will appear to flicker on projection. If, on the other hand, the changes in exposure are slow the projected picture will alternate between light and dark.

No problem generally arises when filming under natural or under incandescent light, since the intensity is generally fairly constant. Although incandescent lamps energised by an AC power supply do flicker slightly, at twice the supply frequency, the intensity variation is so small (no more than about 3%) that it does not noticeably affect the photographic image density.

A problem occurs, however, when AC powered short-arc metal halide, fluorescent and other non-incandescent light sources are used, where the difference in light intensity between the brightest peaks and dimmest troughs may be as much as 70%, or more. In this case, if successive images are exposed during different periods of the lighting cycle they will have considerably different densities, and the resulting picture will therefore appear to flicker when projected.

Between these two extreme conditions there is a "grey area" where there is flicker present but where the effect is within acceptable limits.

To eliminate any possibility of uneven exposure between successive images it is necessary to ensure that either the camera speed, or the exposure period are compatible with the frequency of the AC source powering the lighting. It will be appreciated, of course, that since the exposure period is simply a product of the camera speed (in frames per second) and the angle of the open segment or segments of the rotating or oscillating camera shutter, the camera speed combined with the shutter angle rather than the exposure period could be taken as one of the variables.

Compatibility, that is the substantial absence of flicker, requires one of the following:

1. The camera speed, in frames per second, is substantially exactly divisible into the number of light brightness periods per second. For example, this may be achieved by filming at 25 frames per second when the subject is illuminated by lamps powered by 50 Hz AC (100 peak brightness periods per second) or by filming at 24 frames per second with a 60 Hz power supply (120 peak brightness periods per second). In this case the duration of the exposure period is not important.

2. The duration of the exposure period is substantially exactly the same length as an integral number of periods of lamp brightness. In this case, the camera speed is not important since the integrated exposure over the whole exposure period will always be that produced by a complete number of cycles, no matter where in the cycle the shutter opens.

To achieve these conditions it has been common practice manually to set the shutter opening angle to suit the chosen camera speed and power frequency; or to set the power frequency to suit the chosen camera speed and shutter opening angle; or to set the camera speed to suit the chosen power frequency or combination of power frequency and shutter opening angle. One of the disadvantages of this manual method is that it is very inflexible; any fluctuation from the optimum by any one of the three variables may result in an uneven exposure, and therefore apparent flicker on projection. It is also difficult to make quick and accurate changes manually to any one or combination of the variables while filming; the result of this is that it is impossible to use an in-shot variable shutter facility when filming under non-incandescent artificial light sources. Such variable shutter facilities, and variable camera speed facilities are available on commercial cameras and it would be desirable if the camera could be used to its fullest extent over a wider range of lighting conditions than at present.

A further disadvantage with the prior art is that the camera operator has no indication, when filming, of whether the lighting conditions and the exposure period/camera speed combination he is using is likely to produce flicker when the resulting images are projected, or, if flicker is present, how bad it is likely to be. He has no idea, for example, whether the operating conditions he is using mean that the flicker will fall within acceptable tolerance limits. For this reason, the camera operator has to restrict himself to operating conditions where he is certain that the flicker will be small. He is therefore not able to be flexible in his use of camera speeds and shutter openings. It is also difficult to film under lighting powered by a mobile alternator which does not run at an exact and constant speed, since an operator filming under such lighting is forced to use camera speeds and/or exposure periods which correspond to settings where the tolerance of lighting fluctuations is large.

SUMMARY OF THE INVENTION

The object of the invention is to attempt to alleviate at least some of these disadvantages, and to allow the camera operator to film at settings he would not otherwise dare use.

According to a first aspect of the invention a cinematograph camera flicker indicating device is characterised by means for determining the amount and/or frequency of intensity variation of the lighting of a scene being filmed, and means for indicating if the said amount and/or frequency will produce an unacceptable exposure variation on the film at the camera speed and exposure period in use.

According to a second aspect of the invention a cinematograph camera flicker indicating device is characterised by means for determining or setting the camera speed, means for determining or setting the frequency of intensity variation of the lighting of a scene being filmed, and means for indicating any flicker-producing incompatibility between the said determined and/or set values.

Such a device may conveniently be constructed as a simple add-on attachment to a conventional cinematograph camera. Alternatively, it may be a hand-held device.

In cameras in which a pulse signal is available, the camera speed may be measured by determining the time between pulses. Alternatively, the speed may be measured by mounting a sensor responsive to a rotary part of the camera drive mechanism, for example on the motor shaft. In a further alternative the camera speed may be measured by siting a photocell inside the camera, behind the shutter, so that incident light from the scene falls on the cell. Finally, the camera speed may be preset by the use of a speed controlled motor and may be selectable by means of a variable control or by a switch.

The exposure period, if preset, may be assumed.

The frequency of the lighting may be measured by means of a photocell or a video camera or other light sensitive device. Alternatively, the frequency of the power supply to the lighting may be determined in any standard fashion. It would also be possible to provide an electronic device incorporating one or more preset conditions, or to have the frequency of the power supply to the lighting selectable by means of a variable control or by a switch.

Means may also be provided for determining or setting the exposure period. The exposure duration may be measured by a photocell or other detector inside the camera, or by directly measuring the time between the shutter opening and the shutter closing, or by calculation if the shutter angle and the camera speed are known. Alternatively, the exposure period or shutter aperture may be preset or may be selectable by means of a variable control or by a switch. It would also be possible to provide an electronic control device incorporating setting for various camera speeds and/or shutter openings; or such a device may be preset for one particular camera speed and/or one particular shutter opening.

The indicating means may be a simple alarm system, activated by one or more thresholds, to indicate that an unacceptable flicker is likely to be produced. Alternatively, the indicating means can provide a graded display based upon, for example, the difference between the camera speed, in frames per second and the number of light brightness periods per second and/or upon the difference between the exposure period and an integral number of light brightness periods. Alternatively, the display may be based upon the difference between the lamp intensity frequency minus an integral multiple of the camera frequency and/or upon the camera frequency minus the said difference. The display may also indicate whether or not the variable settings mean that the flicker is likely to fall within the various possible limits of acceptability given in "Film Lighting Using Metal-Halide Lamps: Some Operating Conditions Giving Freedom from Picture Luminance Fluctuations". E.W. Taylor, published in BBC Engineering Division Research Department, BBC RD 1977/19, May 1977. A separate indication may be given, if desired, that no resulting flicker is likely or that it is no more than is known to be tolerable. This has the advantage that, once a camera operator knows that a given displayed value corresponds to a flicker which falls within his subjective tolerance limits, he can with confidence film under any conditions producing a similar value on the display.

Preferably, electronic means, for example a microprocessor, are used to compare the variables and to produce a control signal to the indicating means.

Means may also be provided for determining the amount of the lighting intensity variation, with time, the indicating means also acting in dependence upon the determined intensity variation. The amount of intensity variation in the lighting may be measured by means of a photosensor or a video camera or other light sensitive device being pointed towards the light being used to film by, or towards a similar light source. Alternatively, there may be an electronic device incorporating one or more preset conditions.

It is preferred that the means for determining lighting intensity frequency and the means for determining the amount of lighting intensity variation comprise a common photodetector and, preferably, a microprocessor. The photodetector may advantageously be mounted on the camera, but this is not essential.

The indicating means may be arranged to indicate that no incompatibility exists (or that an incompatibility exists but that the lighting intensity variation is too small for it to be objectionable) if the lighting intensity variation is below a threshold value. This threshold value may be fixed, or it may be dependent upon one or more of the camera speed, the exposure period (or the shutter opening), and the frequency of intensity variation. In particular, the threshold may be dependent upon the difference between the camera speed, in frames per second, and the number of light brightness periods per second and/or the difference between the exposure period and an integral number of light brightness periods. Furthermore, the threshold may be adjustable by the operator, or it may be dependent upon the film type or film speed being used.

According to a third aspect of the invention a cinematograph camera flicker control device is characterised by means for determining whether any flicker-producing incompatibility exists between the camera speed, and/or the exposure period and the frequency of intensity variation of the lighting of a scene being filmed; and automatic control means arranged to vary the camera speed and/or the exposure period and/or the lighting frequecy to reduce or eliminate any such incompatibility. Of course, instead of the exposure period being controlled directly, the shutter opening may be controlled instead.

The control of camera speed and exposure period may be achieved by the use of the variable speed, variable shutter cameras that are now commercially available. The lighting frequency may be adjusted by varying the speed of the alternator generating the lighting power supply.

If suitably flexible lighting were to be available, it would also be possible to arrange for the resulting flicker to be reduced by direct control of the amount of the lighting intensity variation.

A cinematograph camera flicker control device may also include indicating means.

According to a fourth aspect of the invention a cinematograph camera flicker control device is characterised by a photodetector positioned to measure the brightness of successive images being taken by a camera, means for comparing the measured brightness of a plurality of the said images, and for producing a control signal indicative of any unevenness of exposure between images; and control means, acting in dependence upon the control signal, arranged to vary the camera speed and/or the exposure period and/or the lighting frequency to reduce or eliminate the said unevenness of exposure.

In this last aspect of the invention a light sensitive device such as a photodiode may be set behind the cinematograph camera shutter to measure the brightness, preferably the average brightness, of successive images. These brightnesses may then be compared with one another to determine if there is a possibility of uneven exposure between frames.

BRIEF DESCRIPTION OF THE DRAWING

Some specific embodiments of the invention will now be described, by way of example, with reference to the Figure which is a diagrammatic view of one of the embodiments.

DESCRIPTION OF THE PREFERRED EMBODIMENT

The first embodiment that will be described is a flicker monitoring system which provides an indication of conditions will cause flicker, but which has no ability to control the photographic process in order to eliminate the problem; this is left to the human operator. Such a system requires no modification of or addition to the camera or lighting systems, and therefore offers a cheap and simple hand-held accessory which may be used with an existing cinematograph camera.

The embodiment, as shown in the Figure, comprises a photocell 2 mounted on the camera, and positioned so as to receive illumination from the scene being filmed. The signal from this photocell passes to an amplifier 3, and if necessary to filtering circuitry or other circuitry to clean up the signal, and then to an analogue to digital convertor circuit 4, the output of which is passed to a microcomputer or microprocessor 5.

The microprocessor uses the signal provided to measure the amount of lighting intensity variation. It does this by sampling the signal at frequent intervals during the cycle and comparing readings to determine the highest and lowest values. The proportional lighting intensity variation can then be calculated by dividing the difference between the highest value and the lowest value by the highest value. If the response of the photocell is not linear with varying light levels (for example if the output voltage from the photocell varies logarithmically with light level) this is allowed for first.

The microprocessor 5 also measures the lighting intensity frequency as a by-product of the method for measuring the intensity variation. The frequency is determined by timing the difference between peak values, or the difference between trough values. The frequency can then be determined in the usual way.

In this embodiment, neither the camera speed nor the camera shutter aperture angle are directly measured. Instead, they may be set by means of a keyboard 7 attached to the microprocessor 5. A selection of preset values (for example 24 frames per second, or 25 frames per second and 172.8° or 86.4° etc.) is provided.

In operation, the microcomputer measures the brightness level at frequent intervals for a period of time which will span a number of lighting cycles. The exact number of cycles is not important but it should be enough to average out spurious changes in light levels due to momentary reflections, flashes and electrical noise. A period of between 10 and 50 cycles should be suitable. Once the microprocessor has available to it the necessary information on intensity variation and frequency, and the chosen camera speed and shutter aperture, it can determine whether or not the values are incompatible and will be likely to produce flicker. It calculates, first of all, the length of time the shutter is open. This is derived from the values of camera speed and shutter aperture angle by dividing the aperture angle by the camera speed (frames per second) and by 360°. The resulting exposure period is compared with the period of the lighting intensity variation. If the length of the exposure period exactly matches the period of one or more cycles of the lighting intensity variation then there will be no flicker. Similarly, a calculation is carried out to compare the camera speed, in frames per second, with the number of light brightness periods per second; if these are substantially equal there will again be no flicker. In either of these cases, a relevant signal is sent to a display 6.

If neither of these conditions is satisfied then the proportional amount of intensity variation, determined as previously described, is considered. The value may either be displayed directly, or it may be compared with a threshold value to determine whether or not to activate an alarm. This threshold may be derived, for example, from the threshold limits given in the previously-mentioned paper by E. W. Taylor. It will be evident to a skilled man how to program a microcomputer to make use of the limits set out in that paper.

The process of measurement, calculation and display are carried out repeatedly by the microcomputer so that a constantly updated report of the likelihood of flicker is available on the display. The operator can then take appropriate action.

Another embodiment of the invention will now be described, in which the amount of flicker is automatically controlled. In this more complicated system it is convenient for the device to be built directly into the cinematograph camera, so that camera speed and shutter aperture can be directly measured.

For cameras with variable shutter opening the measurement of exposure duration is most easily made by siting a photocell inside the camera, behind the shutter, so that incident light from the scene falls on the cell. Alternatively, a sensor may be fitted to detect directly when the shutter opens and when it closes. The microcomputer can then measure the duration of the period of illumination, and the total period from one shutter opening to the next, with reference to its own internal clock. The camera speed in frames per second can then be calculated from the total time from the start of one period of illumination to the next.

If it is not practicable to mount a photocell inside the camera, it is possible to use the pulse signal, provided by many cameras for synchronisation with other equipment such as sound recorder, instead. A simple interface to the microcomputer can monitor the pulse signal and determine the frame rate by measuring the time between pulses.

If a pulse signal is not available it may be possible to mount a sensor responsive to a rotary part of the camera drive mechanism, for example on the rotary shaft. The period of rotation of the camera motor can then be measured, from which the number of frames per second can be calculated. Alternatively the camera speed may be determined from the speed controller of the camera motor.

In the control part of the circuit, the microprocessor 5 provides a control signal to a control means (not shown) which operates the shutter aperture of an in-shot variable shutter facility. The measured aperture value, or exposure period, is compared by the microprocessor to the required aperture value, or exposure period. If the values differ, the control means energise an electric motor to vary the aperture.

Similarly, the camera speed can be controlled by the control means, on receipt of a suitable control signal from the microprocessor 5. The advantage of using a camera with an in-shot variable shutter facility, and variable speed, is that it is possible, within the limitations of the shutter opening, to maintain an even exposure level if the camera speed is varied, even during the course of the take, by automatically adjusting the shutter to compensate.

The lighting power supply frequency may also be varied under control of the microprocessor. If the lighting supply is derived from a generating set, controlling the frequency is simply a matter of controlling the speed of the generator. If the lighting supply current is obtained from the mains, on the other hand, it is clearly not possible to influence the line frequency. The most convenient way, then, to control the lighting frequency would be to rectify the mains supply, and then to use a variable frequency power oscillator to supply power to the lighting.

The extent to which the system will automatically adjust any of the three variables, and the extent to which these variables may be chosen by the operator may be varied according to the needs of the user. In a comprehensive system, it may be desirable to arrange for the user to decide which one, or several, of the variables he wishes the system automatically to vary. Threshold values and limits may also be programmed into the microcomputer to limit the automatic operation of the system to any desired region of the variable space.

In a final embodiment, the possibility of flicker is determined, directly, by means of a photocell placed beind the camera shutter and which sees the scene in the same intermittent manner as does the film.

I claim:

1. A cinematograph camera flicker indicating device comprising: means for determining the amount and/or frequency of intensity variation of the lighting of a scene being filmed, and means for indicating if said amount and/or frequency will produce an unacceptable exposure variation on the film at said camera speed and exposure period in use.

2. A cinematograph camera flicker indicating device comprising: means for determining or setting the camera speed, means for determining or setting the frequency of intensity variation of the lighting of a scene being filmed, and means for indicating any unacceptable flicker-producing incompatibility between said determined and/or set values.

3. A device according to claim 2 including means for determining or setting said exposure period.

4. A device according to claim 3 in which said indicating means is arranged to indicate that an unacceptable incompatibility exists if said camera speed, in frames per second, is not substantially equal to sad number of light brightness periods per second and said exposure period is not substantially equal to an integral number of light brightness periods.

5. A device according to claim 3 including means for determining the amount of the lighting intensity variation, with time, said indicating means also acting in dependence upon said determined intensity variation.

6. A device according to claim 2 including means for determining the amount of the lighting intensity variation, with time, said indicating means also acting in dependence upon said determined intensity variation.

7. A device according to claim 2 in which said indicating means is arranged to indicate that an unacceptable incompatibility exists if said camera speed, in frames per second, is not substantially equal to said number of light brightness periods per second and said exposure period is not substantially equal to an integral number of light brightness periods.

8. A device according to claim 7 including means for determining the amount of the lighting intensity variation, with time, said indicating means also acting in dependence upon said determined intensity variation.

9. A device according to claim 8 in which said indicating means is arranged to indicate that no unacceptable incompatibility exists if said lighting intensity variation is below a threshold value.

10. A device according to claim 8 in which said means for determining said lighting intensity frequency and said means for determining said amount of lighting intensity variation comprise a common photodetector.

11. A cinematograph camera flicker control device comprising: means for determining whether any unacceptable flicker-producing incompatibility exists between the camera speed, the exposure period and the frequency of intensity variation of the lighting of a scene being filmed; and automatic control means arranged to vary said camera speed and/or said exposure period and/or said lighting frequency to reduce or eliminate any such incompatibility.

12. A device according to claim 11 in which said incompatibility determining means is arranged to determine that an unacceptable incompatibility exists if said camera speed, in frames per second, is not substantially equal to said number of light brightness periods per second and said exposure period is not substantially equal to an integral number of light brighness periods.

13. A device according to claim 12 including means for determining the amount of lighting intensity variation, with time, said incompatibility determining means also acting in dependence upon said determing lighting intensity variation.

14. A device according to claim 11 including means for determining the amount of lighting intensity variation, with time, said incompatibility determining means also acting in dependence upon said determined lighting intensity variation.

15. A device according to claim 14 in which said control means is not activated if said lighting intensity variation is below a threshold value.

16. A cinematograph camera flicker control device comprising: a photodetector positioned to measure the brightness of successive images being taken by a camera, means for comparing the measured brightness of a plurality of said images, and for producing a control signal indicative of any unevenness of exposure between said images; and control means, acting in dependence upon said control signal, arranged to vary said camera speed and/or said exposure period and/or said lighting frequency to reduce or eliminate said unevenness of exposure.

17. A cinematograph camera flicker indicating device comprising: means for determining the amount of intensity variation of a scene being filmed, and means for indicating if the said amount will produce an unacceptable exposure variation on the film at said camera speed and exposure period in use.

18. A cinematograph camera flicker indicating device comprising: means for determining the amount and frequency of intensity variation of a scene being filmed, means for determining or setting the speed of said camera, means for determining or setting the exposure period of said camera, and means for indicating any unacceptable flicker-producing incompatibility between said determined and/or set values.

* * * * *

UNITED STATES PATENT AND TRADEMARK OFFICE
CERTIFICATE OF CORRECTION

PATENT NO. : 4,669,840

DATED : June 2, 1987

INVENTOR(S) : David Samuelson

It is certified that error appears in the above-identified patent and that said Letters Patent is hereby corrected as shown below:

Column 7, Claim 4, Line 52:

reads: "frames per second, is not substantially equal to sad num-"

should read: --frames per second, is not substantially equal to said num- --

Signed and Sealed this

Twenty-second Day of September, 1987

Attest:

DONALD J. QUIGG

Attesting Officer     Commissioner of Patents and Trademarks